Sept. 13, 1955 W. W. PHARIS 2,717,923

CODE CALL CIRCUIT

Filed June 5, 1951 5 Sheets-Sheet 1

INVENTOR.
WILLIAM W. PHARIS

BY H. Mullerheim

AGENT

INVENTOR.
WILLIAM W. PHARIS
BY
AGENT

INVENTOR.
WILLIAM W. PHARIS
BY
[signature]
AGENT

Sept. 13, 1955 W. W. PHARIS 2,717,923

CODE CALL CIRCUIT

Filed June 5, 1951 5 Sheets-Sheet 4

INVENTOR.
WILLIAM W. PHARIS

BY

AGENT

Sept. 13, 1955 W. W. PHARIS 2,717,923

CODE CALL CIRCUIT

Filed June 5, 1951 5 Sheets-Sheet 5

INVENTOR.
WILLIAM W. PHARIS

BY K. Mullerheim

AGENT

United States Patent Office
2,717,923
Patented Sept. 13, 1955

2,717,923

CODE CALL CIRCUIT

William W. Pharis, Rochester, N. Y., assignor to Stromberg-Carlson Company, a corporation of New York Application June 5, 1951, Serial No. 229,957
14 Claims. (Cl. 179—18)

Figure 1:
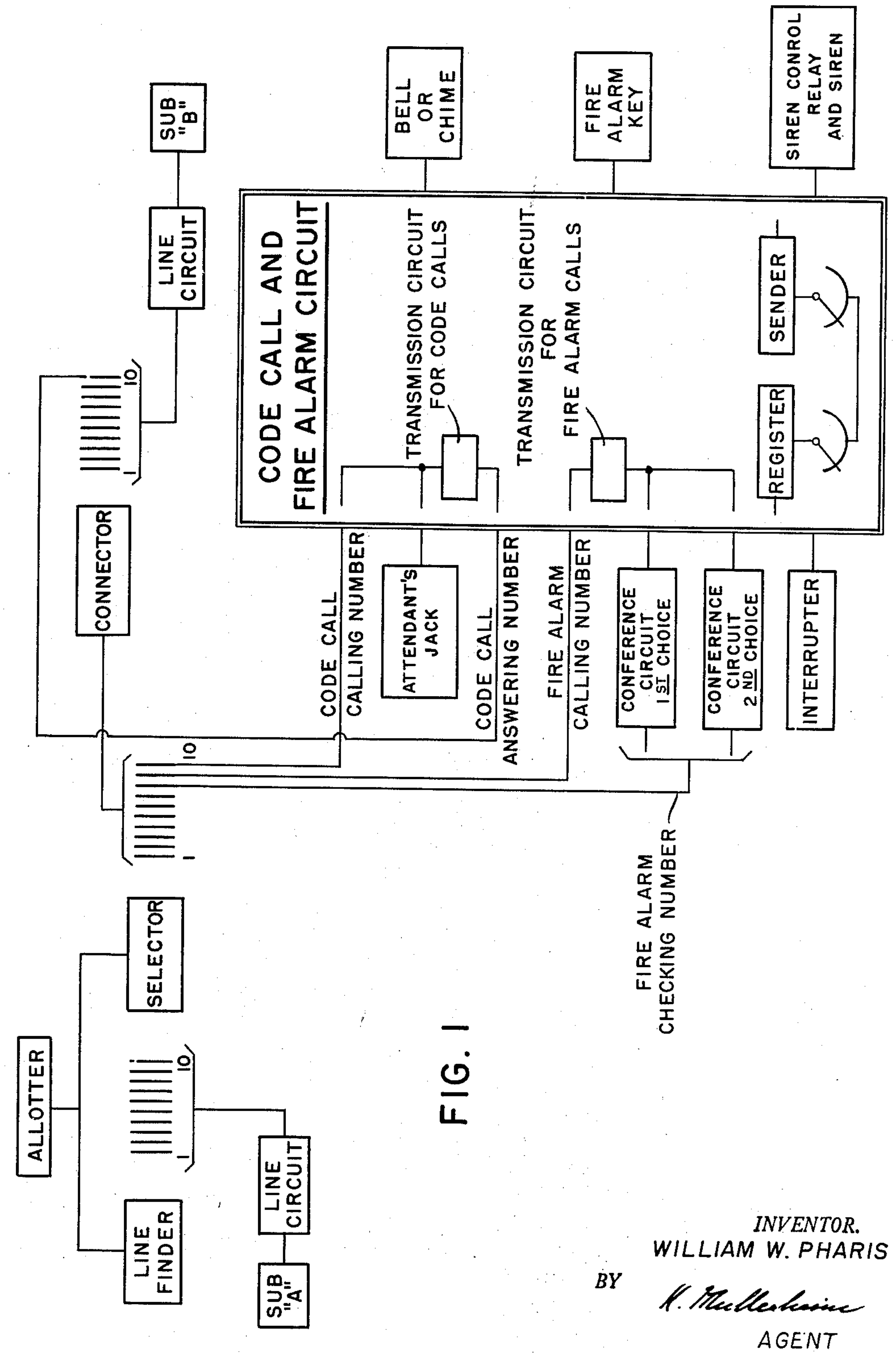

This invention relates to telephone systems and more particularly to paging or code call apparatus in private dial offices.

Such code signaling apparatus makes it possible to reach certain persons in a business or similar establishment even though the person is temporarily absent from his desk or other normal location. To this end a calling party after obtaining connection with the code call apparatus dials a digit or digits designating the wanted party, whereupon a coded signal characteristic of this party is sounded by bells or other signaling means provided in suitable locations throughout the establishment. The wanted party upon hearing this signal answers the call by establishing connection with the code call apparatus from the nearest telephone. This stops the transmission of the paging signal and completes a talking connection between the paged party and the paging party.

It is an object of the present invention to facilitate the transmission by such code signaling apparatus of signals of an urgent nature such as fire alarm signals and the setting up of a talking connection between an alarm answering party and the alarm originating party, whereby the first mentioned party may ascertain the character, location, etc., of the emergency.

It is another object of the invention to provide a code signaling apparatus of the type just referred to in which alarm calls are given preference over paging calls.

More specifically, it is an object of the invention to provide a code signaling apparatus which at all times is capable of receiving such an alarm call, transmitting a characteristic alarm signal and setting up an alarm checking connection irrespective of whether the apparatus is still seized by a previous paging call.

In this connection it is another object of the invention to provide a code signaling apparatus in which, upon receipt of an alarm call by the apparatus, the transmission of a signal originated by a previously received paging call is suppressed if the paging call is still unanswered but in which the talking connection between a paging party and a paged party is left undisturbed if such a previously received paging call has already been answered and the conversation between the paging and paged parties is still in progress.

It is another object of the invention to provide a code signaling apparatus in which a plurality of alarm checking parties, for instance a number of firemen, by dialing an answering number in response to an alarm signal transmitted by that apparatus may be connected together in a conference connection with the alarm originating party.

Still another object of my invention is to provide a code signaling apparatus of the type just referred to in which the transmission of the alarm signal is stopped by the clearing of the alarm originating party but in which the conference connection between the alarm checking parties is not affected by such clearing of the alarm originating party.

In accordance with the preferred form of my invention, the foregoing and other objects are carried out by providing a combined code call and fire alarm apparatus having two transmission circuits or talking paths and having two calling numbers and two answering numbers, the first transmission circuit and the first calling and answering numbers being used for paging calls and the second transmission circuit and the second calling and answering numbers being set aside for fire alarm calls. The second transmission circuit preferably is in the form of a conference circuit.

The features of my invention which I believe to be novel are set forth with particularity in the appended claims. My invention itself, both as to its organization and manner of operation, together with further objects and advantages thereof, may best be understood by reference to the following description taken in connection with the accompanying drawings.

Figure 2:
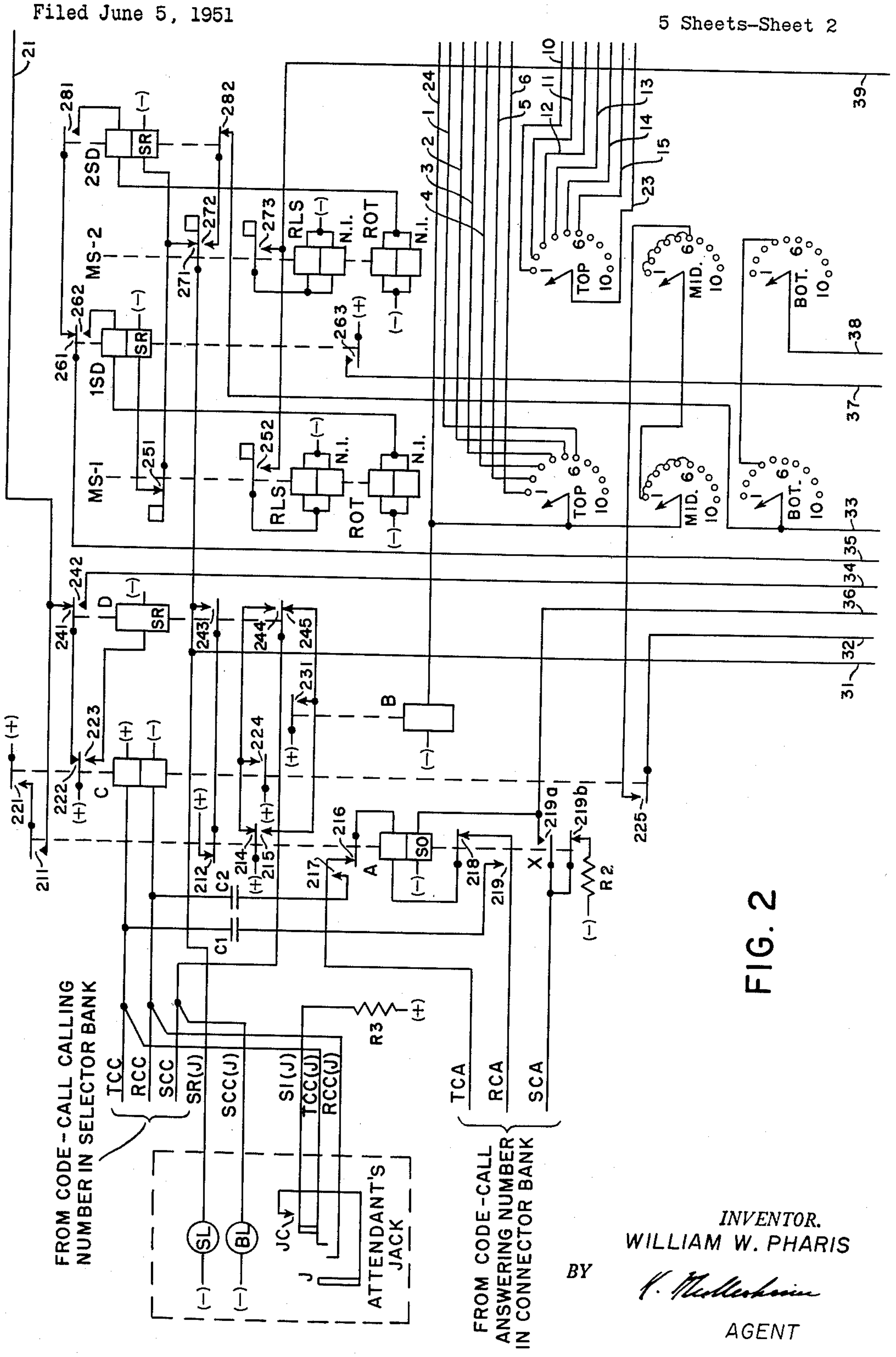
Figure 3:
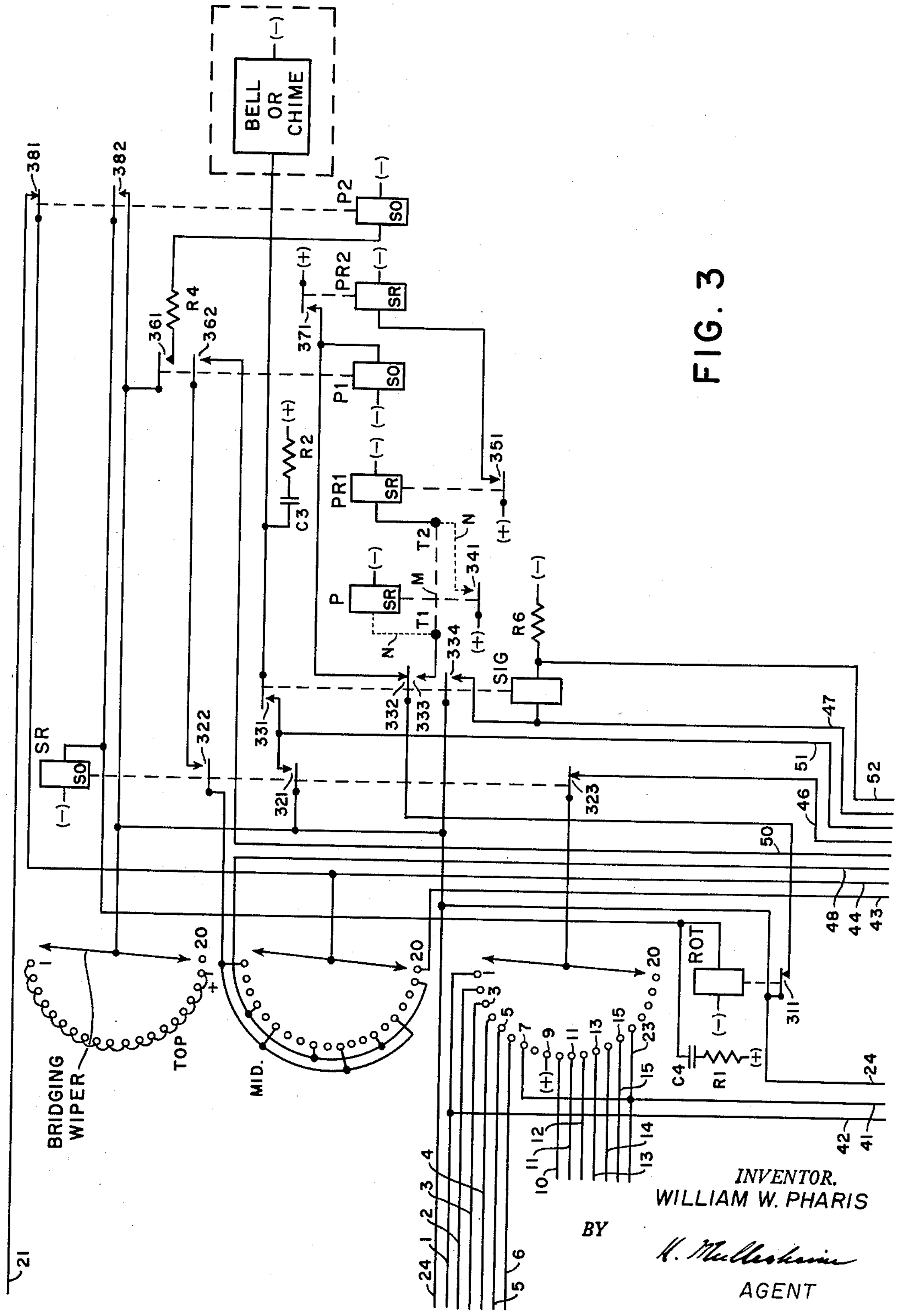
Figure 4:
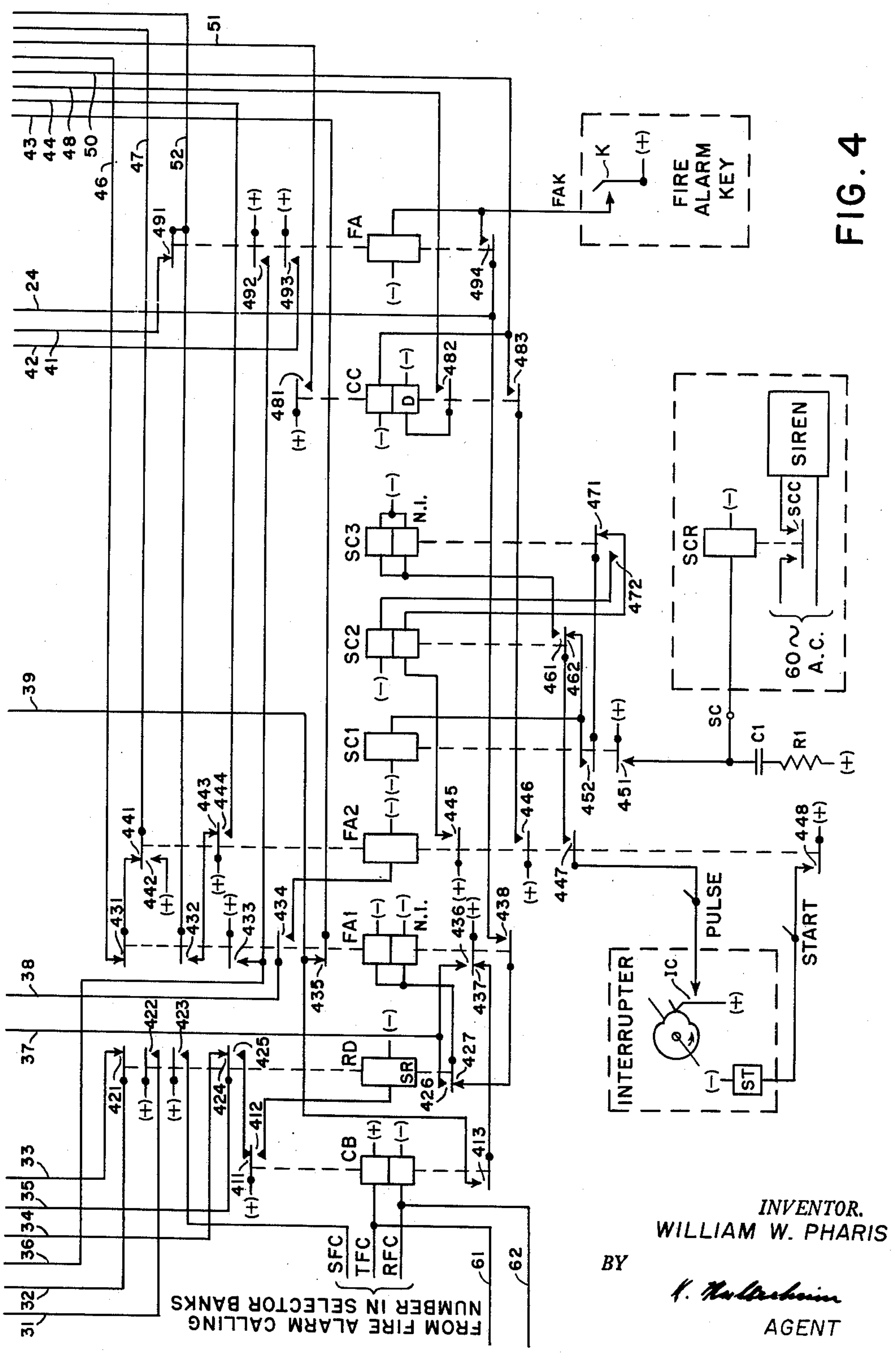

In the drawings, Fig. 1 is a block diagram illustrating the principal components of an automatic telephone system employing the principles of my invention. Figs. 2, 3 and 4, with Fig. 3 placed to the right of Fig. 2 and Fig. 4 placed underneath Figs. 2 and 3, represent a schematic circuit diagram of a combined code call and fire alarm apparatus according to a preferred embodiment of my invention, together with the equipment associated therewith.

Figure 5:
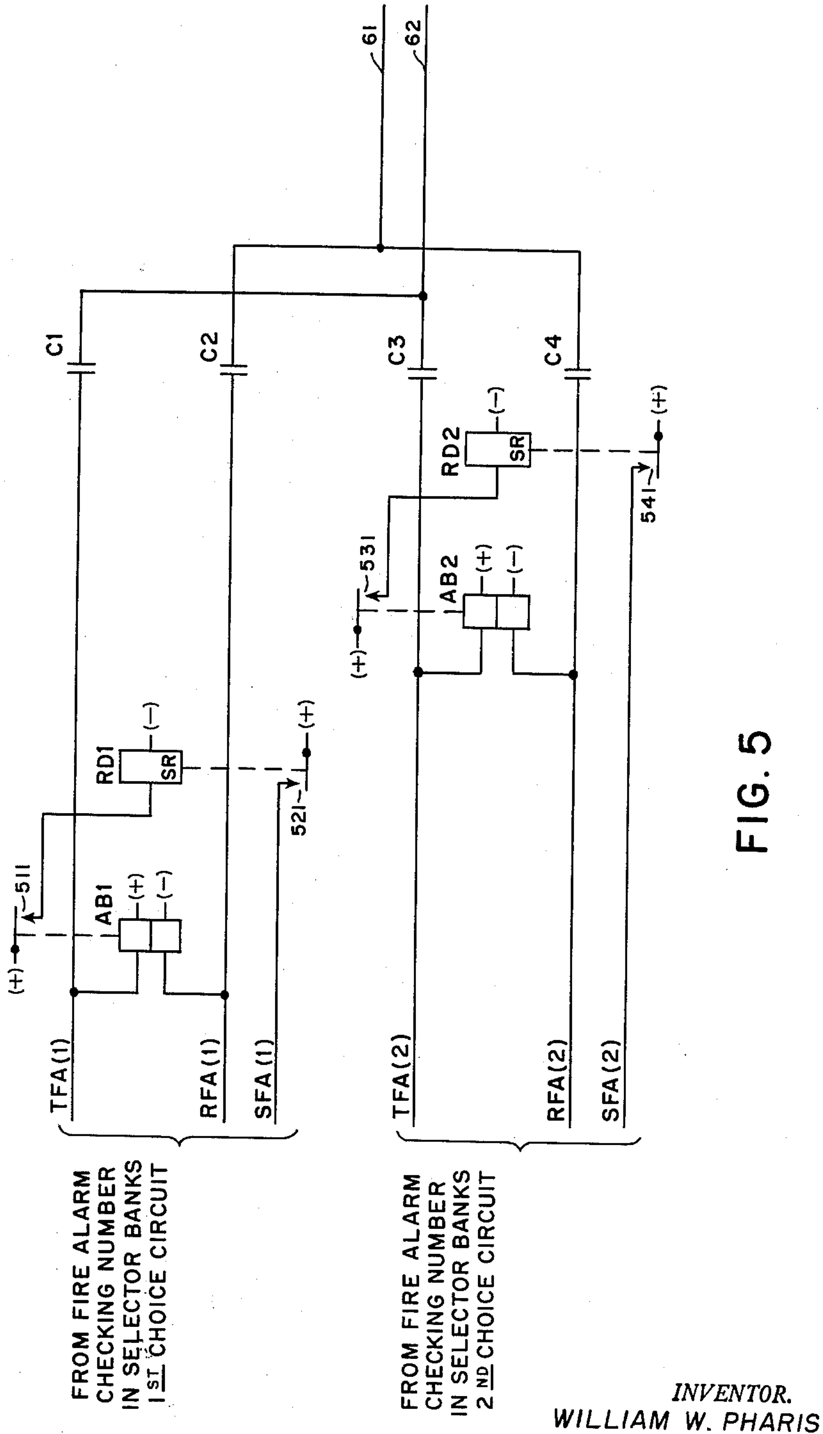

Fig. 5 illustrates a conference circuit for use with the code call apparatus according to Figs. 2–4.

Referring now to the drawings, there is schematically shown in Fig. 1 an automatic telephone system, for example a private automatic exchange, comprising several groups of line finder-selector links each group served by an allotter, and several groups of connectors. Both the line finders and connectors have access through a common multiple (not shown) to a number of line circuits such as the line circuits associated with subscribers A and B.

The aforementioned circuits schematically shown in the top portion of Fig. 1 may be of any known type. However, suitable circuits for this part of the telephone system, Fig. 1, are illustrated and described in a copending application of Frank A. Morris, Serial No. 743,415, filed April 23, 1947, and assigned to the same assignee as the present invention, the switches used in the system according to the copending application being of the XY type.

In the operation of the telephone system, Fig. 1, a subscriber at substation A wishing to establish a connection with subscriber B, removes his hand set, thereby causing an idle line finder pre-selected by the allotter of the group to hunt for the calling line circuit. The subscriber thereupon dials the first digit of the called subscriber's number, which in this case is any of digits 1–7 as the connectors are accessible over any of the first seven selector levels. Upon being set on the desired level the selector automatically hunts for a trunk within this level which terminates in an idle connector in the selected group. The calling subscriber then dials the remaining two digits of the called subscriber's number to cause the connector to seize this subscriber's line circuit and transmit ringing current over this line provided the line is idle. Upon answering of the call by this subscriber, the ringing is stopped and both parties A and B are connected together, transmission battery for both subscribers being furnished by the connector. As shown in Fig. 1, subscribers' line circuits may be connected to any of the ten levels of the line finders and connectors.

Should the calling subscriber A fail to receive an answer from subscriber B because the latter happens to be absent from his desk, and assuming that subscriber B is one of the parties who have a paging code assigned to them, the calling subscriber A may attempt to reach the desired party by means of the code call apparatus shown in the right-hand portion of Fig. 1. As the code call calling trunk leading to the combined code call and fire alarm circuit shown in this figure is reached over the tenth selector level, the calling subscriber, after replacing his receiver upon his unsuccessful attempt to reach subscriber B directly, dials the first digit "0" to connect himself with the aforementioned circuit.

As shown in Fig. 1, the code call apparatus comprises a register which in the preferred embodiment described herein consists of two stepping switches of the minor switch type; a sender which in this example is in the form of a rotary stepping switch; and two transmission circuits, one for code calls and the other for fire alarm calls.

The subscriber now dials two further digits to set the two minor switches in the code call apparatus to mark the sender switch in accordance with the paging code of the wanted party B, whereupon the sender switch is automatically stepped to cause this code signal to be repeatedly sounded over a number of suitably located bells or chimes, Fig. 1, connected with the code call apparatus.

Upon hearing his code, subscriber B goes to the nearest telephone and dials the code call answering number. As may be seen from Fig. 1, the code call answering trunk leading to the code call apparatus is connected to a set of contacts in the tenth connector level. The number to be dialed by the subscriber in answer to the code call thus is a three-digit number of which the first digit is any of digits 1–7, the second digit is 0, and the third digit any convenient digit, such as 0. The code call apparatus thereupon acts to stop the ringing current sent out by the connector and connect the paging and paged parties together over the code call transmission circuit shown in Fig. 1. Also the transmission of the code of the desired party by the rotary sender switch is automatically stopped upon the next completion of a code cycle.

Upon seizure of the code call apparatus over the code call calling number, this calling point of access to the code call apparatus was automatically made busy, and when the paged subscriber obtained access to the apparatus over the call code answering number, this answering point of access also was made busy. The code call calling and answering numbers remain so guarded during the conversation between the two subscribers. Upon release of the calling subscriber the guarding potential is removed from the test lead of the code call calling number to permit the preceding equipment to release, but if the called subscriber is still on the line this potential is immediately reconnected to this test lead. Both the code call calling and answering trunks are then held busy in the code call apparatus until the called party also releases.

The operation of the apparatus shown in Fig. 1 is connection with a fire alarm call will now briefly be described. In order to cause the combined code call and fire alarm apparatus to transmit a signal denoting a fire alarm, the alarm originating party dials the first digit 9 to set the selector on the fire alarm calling trunk leading to that apparatus. When seized over this fire alarm calling trunk the code call apparatus acts to guard not only the fire alarm calling trunk to this apparatus but also the calling and answering trunks for paging calls against seizure by another call, thus preventing interference with the fire alarm by any other call. Thereafter, the alarm originating party dials two further digits which set each minor switch in the code call circuit on a set of contacts over which the rotary sender switch bank is marked so as to cause this switch to transmit the characteristic fire alarm code over the above mentioned bells or chimes of the code call system. At the same time a siren control relay, also connected to the combined code call and fire alarm apparatus as schematically shown in Fig. 1, is brought under the control of an interrupter, Fig. 1, to cause a fire alarm siren to be sounded intermittently. The siren is mounted in a suitable location from where it may be heard throughout the establishment.

The code call apparatus according to the preferred embodiment of the invention enables a number of subscribers to simultaneously establish a talking connection with the fire alarm originating party by dialing the fire alarm checking number for obtaining from this party further information with regard to the character, location, extent, etc., of the emergency. As will be seen from Fig. 1, there is provided a group of conference circuits, in the instant example two, each of which is at one end connected to a separate set of terminals in the eighth selector level and at the other end to the fire alarm transmission circuit in the code call apparatus. Trunk hunting is provided on this selector level in the usual manner so that if the first conference circuit has been taken into use by a first checking party the selector, upon a subsequent call from another alarm checking party, will automatically seize the second conference circuit. In this way a conference connection is established between all the alarm checking parties and the alarm originating party.

Answering of one or more alarm checking parties over the fire alarm checking number does not stop the transmission of the fire alarm signal but this signal continues to be sent out by the code call apparatus until the alarm originating party disconnects. Furthermore, when the last mentioned party clears, guarding potential is removed from the fire alarm calling number and the code call calling and answering numbers, but the conference connection between the individual alarm checking parties is not interfered with, the fire alarm checking trunks becoming available again as each alarm checking party retires from the connection.

Assuming that at the time the code call apparatus is seized over the fire alarm calling number a paging signal originated by a call over the code call calling number is still in process of transmission, the transmission of this signal will instantaneously be stopped and the rotary sender switch returned to normal at a fast stepping rate in preparation of the transmission of the characteristic fire alarm code. If, on the other hand, at the time a fire alarm call is received, a previously received paging call has already been answered but the conversation between the paging and paged parties is still in progress, this conversation will not be disturbed by the last mentioned call so that a fire alarm may be sounded and a fire alarm checking conference be held while the conversation between the paging party and the paged party takes place.

As shown in Fig. 1, there is also provided a fire alarm key by which the code call apparatus may be controlled to transmit a fire alarm signal. In the embodiment of the invention described herein, operation of this key does not result in the interruption of a paging signal which happens to be in the process of transmission but the fire alarm signal, which in the present case is a signal distinct from the alarm signal originated by a telephone call over the fire alarm calling number, is substituted for the paging signal as soon as the rotary sender switch has returned to normal upon the next completion of a signaling cycle.

The code call transmission circuit of the combined code call and fire alarm circuit shown in Fig. 1 is also connected to an attendant's jack and the code call apparatus may thus be seized from this jack for the purposes of a code call. In this connection it should be noted that while the automatic telephone system schematically illustrated in Fig. 1 has so far been assumed to be an unattended private automatic exchange, this exchange may also be of the attended type and the aforementioned jack associated with the telephone switchboard of that exchange. Furthermore, while no trunk connections to or from a public office are shown in Fig. 1, the private telephone office may well be a private branch exchange. In this case the trunks to the main exchange may be accessible through a given selector level and these trunks may also be connected to line finders to facilitate the setting up of calls from the public exchange to subscribers connected to the private exchange or to the code call apparatus therein.

The combined code call and fire alarm apparatus, the circuit of which is shown in Figs. 2–4 of the drawings, will now be described in greater detail. In these figures, Figs. 2 and 3 illustrate the code call apparatus proper while Fig. 4 shows the circuit components specifically used on fire alarm calls. More particularly, Fig. 2 shows the code call calling and answering points of access to the apparatus; two minor switches MS–1 and MS–2 for registering the digits determining the code to be transmitted, each of these minor switches having a rotary magnet, a release magnet and three contact banks and wipers; an associated group of relays; and an attendant's jack J which may be connected with the code call apparatus. Fig. 3 illustrates a rotary switch RS comprising a stepping magnet and three contact banks and these associated pairs of wipers, each wiper of a pair being staggered relatively to the other wipers by 180 degrees; a number of stepping and signal transmitting relays; and one or more signal devices such as bells or chimes controlled by the apparatus. Fig. 4 illustrates a group of relays used in setting up a fire alarm call; the fire alarm calling point or access to the apparatus; a fire alarm key which may be connected with the apparatus to initiate the transmission of a distinct fire alarm signal; a siren control relay and siren for use in conjunction with fire alarms; and an interrupter which is preferably common to the telephone exchange and serves to furnish control pulses for the operation of the aforementioned siren control relay.

In the following description it is to be understood that the positive terminal of the exchange battery is connected to ground. This terminal is hereafter referred to as "ground", while the negative terminal of this battery is briefly referred to as "battery."

*Paging call*

As mentioned above, in order to make a paging call, for example after an unsuccessful attempt to reach the desired party directly, a calling subscriber dials a first digit to set the selector on the level (ten) to which the code call calling trunk terminating in the code call apparatus is connected. If this trunk is idle, i. e. if no (+) is connected to test conductor SCC, Fig. 2, relay C, Fig. 2 is operated over the talking leads TCC and RCC of the last mentioned trunk upon switch-through of the selector. Relay C in operating causes the operation of slow release relay D over an obvious circuit. At its make contact 244 relay D connects ground from closed make contact 224 of relay C to the test conductor SCC of the code call calling trunk to hold the preceding equipment and make this trunk busy to other calls; and at its make contact 243 relay D closes the following circuit to the lower windings of slow release relays 1SD and 2SD: ground, break contact 212 of relay A, make contact 243 of relay D, off-normal contact 271 of minor switch MS–2; and from there through the lower winding of relay 2SD to battery, and also, through off-normal contact 251 of minor switch MS–1 and the lower winding of relay 1SD to battery. Both relays 1SD and 2SD operate to prepare a circuit for the receipt of dial pulses.

The calling subscriber now dials the two digits determining the code to be transmitted for paging the wanted party, this code in the present instance being assumed to consist of a first series of two signal elements followed, after a separating interval, by a second series of three signal elements, the two digits to be dialed into the code call apparatus to produce this code being "2" and "3." In this connection is will be noted from an inspection of the wiring of the top and middle banks of minor switches MS–1 and MS–2, that the code call apparatus according to the embodiment illustrated in the drawings is arranged for the transmission of any of 36 paging codes corresponding to a setting of the first minor switch on any of steps 1–6 and a setting of the second minor switch on any of steps 1–6.

Since the first digit dialed into the code call apparatus itself is assumed to be 2, relay C responds to the corresponding impulses by releasing and reoperating twice. Upon its first release relay C closes a circuit for rotary magnet ROT of minor switch 1 in series with the upper winding of relay 1SD which circuit may be traced as follows: ground, break contact 222 of relay C, make contact 242 of relay D, conductor 34, break contact 424 of relay RD, Fig. 4, conductor 35, make contact 262 of relay 1SD, Fig. 2, upper winding of relay 1SD, magnet ROT of minor switch MS–1, battery. In response to the operation of rotary magnet ROT of minor switch 1, this minor switch moves its wipers to the first set of bank contacts. Simultaneously, the off-normal contacts of this minor switch are operated as a result of which the circuit to the lower winding of relay 1SD is opened at off-normal contacts 251. Due to its slow release characteristics, however, this relay remains operated throughout the first series of impulses. Upon the second release of relay C in response to the second dial impulse, the rotary magnet of minor switch 1 will again be operated and the wipers of this switch advanced to its second position. Relay D being slow-to-release is held operated during impulsing.

At the end of this series of two impulses, relay 1SD releases slowly, thereby transferring the above-traced impulse circuit at contacts 262, 261 from the upper winding of relay 1SD to the upper winding of relay 2SD and the rotary magnet of the second minor switch in series. When the calling subscriber dials the next and last digit which was assumed to be 3, relay C releases three times and as a result the rotary magnet of the second minor switch is energized three times to advance the wipers of this switch to the third position. Upon the first step of minor switch 2 the set of off-normal contacts of this switch is operated so that the lower winding of relay 2SD is de-energized at contact 271. However, due to its slow release characteristic, this relay remains operated over its upper winding during impulsing.

Upon completion of this last series of impulses relay 2SD releases thereby closing the following sender switch starting circuit for slow operating relay P1, Fig. 3: ground, break contact 212 of relay A, make contact 243 of relay D, off-normal contact 272 in operated position, break contact 282 of relay 2SD, conductor 33, break contact 421 of relay RD, Fig. 4, conductor 32, make contact 225 of relay C, Fig. 2, strapping between contacts 1–6 of the middle bank of minor switch MS–2, middle wiper of minor switch MS–2 in position 3; strapping between contacts 1–6 of the middle bank of minor switch MS–1, middle wiper of minor switch MS–1 in position 2, conductor 24, break contact 311 of the stepping magnet ROT of the rotary switch RS, Fig. 3, break contact 332 of relay SIG, winding of relay P1, battery. A relay B, Fig. 2, which is directly connected to conductor 24, is operated over most of the last-traced circuit in multiple with relay P1. As described in more detail hereafter, relay B on operating closes its make contact 231 to keep the code call calling trunk busy at the end of a code call until the sender switch has returned to normal. The operation of relay P1 in the last-traced circuit extends the starting ground on conductor 24, Fig. 3, through make contact 361 of relay P1 and a resistor R4 to slow operating relay P2 and battery. Relay P2, upon operating in this circuit, extends the aforementioned ground on conductor 24 through its make contact 382 to slow operating relay SR and the stepping magnet ROT of rotary switch RS in parallel.

The operation of relay SR is without effect at this time. The rotary magnet ROT upon operating opens its interrupter contact 311, thereby opening the above-traced circuit of relay P1. Consequently, relay P1 releases, opening the circuit to relay P2 which in releasing in turn opens the circuit to relay SR and the rotary magnet. Upon the resultant release of stepping magnet ROT the rotary switch advances its wipers from position 20 to position 1 in which position a multiple ground is connected to conductor 24 via the top bank and wiper of the rotary switch.

In this connection it should be noted that while the bottom and middle wipers of the rotary switch are of the non-bridging type, the top wiper of this switch is a bridging wiper and serves to maintain the aforementioned multiple ground on conductor 24 during the stepping of the switch without interruption until the switch returns to its home position 20.

The aforementioned release of stepping magnet ROT also causes the circuit of relay P1 to be reclosed upon closure of the interrupter contact 311 of magnet ROT so that relays P1, P2 and SR again operate in sequence. Stepping magnet ROT upon operating in multiple with relay SR again opens the circuit of relay P1 so that relays P1, P2 and SR restore in this order and stepping magnet ROT also releases, thereby advancing the rotary switch to its second position and reclosing starting ground to relay P1.

This interaction between relays P1 and P2 and the rotary magnet and the consequent step by step movement of the latter continue until the switch reaches its fifth position in which the following circuit is closed for relay SIG: ground on starting conductor 24, Fig. 2, top wiper of minor switch 1 in position 2, associated top bank contact of minor switch MS–1, conductor 5, bottom bank contact 5 of rotary switch RS, Fig. 3, bottom wiper of this switch in position 5, break contact 323 of relay SR, conductor 46, break contact 431 of relay FA–1, Fig. 4, break contact 441 of relay FA–2, conductor 47, relay SIG, Fig. 3, resistor R6, battery. In this connection it will be noted that contacts 1–6 of the top bank of minor switch 1 are connected to contacts 1–6 of the bottom bank of sender switch RS in reverse order. Upon operating in this circuit relay SIG at its make contact 334 locks to ground on conductor 24, at its make contact 331 prepares a circuit to the signaling device over the "Signal" conductor, and at its break-make contact 332, 333 transfers ground from the winding of relay P1 to the winding of relay PR1 provided that "M" wiring is used; the last mentioned relay upon operation closes a circuit to slow release relay PR2 which in turn operates P1 over an obvious circuit. Terminals T1 and T2 are connected together by means of the aforementioned "M" wiring (shown in broken lines) when chimes or gongs or other quick acting signaling devices are connected to the "Signal" conductor and "M" wiring is omitted and "N" wiring (shown by dotted lines) used instead if loud ringing bells or similar slow acting devices are employed. As will readily be seen, if "M" wiring is used the winding of relay PR1 is directly connected to make contact 333 of relay SIG, whereas if "N" wiring is used instead of "M" wiring the winding of slow-acting relay P is connected to the last mentioned contact of relay SIG so that in the latter case relay PR1 acts as a slave relay to relay P, and rotary switch RS is stepped at a correspondingly slower rate. Thus, the stepping speed of the rotary switch may be set in accordance with the response characteristic of the signaling devices. It should be pointed out, however, that regardless of whether "M" or "N" wiring is used the stepping speed of rotary switch RS is less with relay SIG operated than with relay SIG released for the reason that in the former case slow release relays PR1 and PR2 or relays P, PR1 and PR2 are included in the interrupter cycle. As will become clear from the following description, this is for the purpose of advancing the rotary switch during the transmission of the individual signal elements at a rate sufficiently slow for the proper transmission of the signals but providing for a relatively rapid stepping movement of the switch between series of signal elements to produce spacings of suitable length between these series of elements.

Returning to the operation and locking of relay SIG and the subsequent operation of relays PR1, PR2 and P1 after sender switch ROT has reached its fifth position, operation of the last-mentioned relay brings about the operation of relay P2 which in turn causes the operation of relay SR and stepping magnet ROT. Relay SR on operating completes the circuit to the signaling device or devices over the following circuit: ground on conductor 24, make contact 321 of relay SR, make contact 331 of relay SIG, "Signal" conductor, signaling device, battery. As a result the signaling device is actuated and kept actuated until the circuit last traced is opened upon the release of relay SR. This release of the SR relay is brought about by the sequential release of relays PR1, PR2, P1 and P2 incidental to the opening of rotary magnet interrupter contact 311 upon the last mentioned operation of this magnet. Upon the release of relay P2 stepping magnet ROT being connected in parallel with relay SR also releases, thereby advancing the rotary switch from position 5 to position 6 and reclosing the circuit of relay PR1 at the interrupter contact of magnet ROT. Relays PR1, PR2, P1, P2 and SR thus are operated again and the circuit to the signaling device is reclosed at make contact 321 of relay SR. At the same time stepping magnet ROT operates causing the sequential release of relays PR1, PR2, P1, P2 and SR and also the release of the stepping magnet itself so that the rotary switch is advanced into position 7.

In position 7 of the rotary switch shorting ground is connected to the right-hand terminal of the winding of relay SIG over the following path: ground on conductor 24, contact 334 of relay SIG, conductor 47, break contact 441 of relay FA2, Fig. 4, break contact 431 of relay FA1, conductor 46, break contact 323 of relay SR, Fig. 3, bottom wiper of rotary switch RS in position 7, contact 7 of the bottom bank of this switch, conductor 41, break contact 491 of relay FA, Fig. 4, conductor 52, right-hand terminal of relay SIG. This short circuit causes relay SIG to release, thereby opening both its locking circuit and its short circuit at its contact 334, holding the circuit to the signaling device open at its contact 331 and transferring the stepping circuit of the rotary switch from relay PR1 directly to relay P1 at contacts 333, 332. It will thus be seen that while the rotary switch was advanced from position 5 to position 7 at a slow rate to transmit the two signal elements constituting the first portion of the called subscriber's code the switch will now be advanced at a relatively rapid rate. This relatively fast stepping continues until the rotary switch reaches position 9 where the following new circuit is closed for relay SIG: ground, contact 9 of the bottom bank of the rotary switch, bottom wiper of this switch, break contact 323 of relay SR, conductor 46, break contact 431 of relay FA1, Fig. 4, break contact 441 of relay FA2, conductor 47, winding of relay SIG, Fig. 3, resistor R6, battery. Upon operating, relay SIG again closes its locking circuit, prepares a circuit to the signaling device and transfers the stepping circuit from relay P1 to relay PR1. As a result rotary switch RS is now advanced at a slow rate and during each step of the switch a signal element is transmitted over the "Signal" conductor during the time that relay SR is operated.

In this fashion the sender switch RS is stepped from position 9 to position 12 whereby three signal elements corresponding to the last digit 3 of the called subscriber's code call number are transmitted. When the rotary switch reaches position 12 a short circuit is again established for relay SIG over the following path: ground on conductor 24, make contact 334 of relay SIG, conductor 47, break contact 441 of relay FA2, Fig. 4, break contact 431 of relay FA1, conductor 46, break contact 323 of relay SR, Fig. 3, bottom wiper of rotary switch RS in position 12, contact 12 in the bottom bank of this switch, conductor 12, contact 3 of the top bank of minor switch MS–2, Fig. 2, top wiper of this switch in position 3, conductor 41, break contact 491 of relay FA, Fig. 4, conductor 52, right-hand terminal of signal relay SIG, Fig. 3. Due to this short circuit relay SIG again releases thereby opening its locking circuit and the just traced short circuit at its contact 334, holding the circuit to the signaling device open at its contact 331 and transferring the stepping circuit from relay PR1 back to relay P1 at its break-make contact 333, 332. Consequently, rotary switch RS is now advanced over the remaining steps of its bank at a rapid rate and without the transmission of further signal elements.

When the switch is finally stepped from position 19 to its home position 20, the aforementioned multiple ground is removed from conductor 24 at the top wiper of the rotary switch. The following operation now depends on whether at the time switch RS reaches position 20 the paging call has been answered or not. Assuming that the call has not yet been answered, starting ground is still connected to conductor 24 via break contact 212 of relay A, make contact 243 of relay D, operated contact 272, break contact 282 of relay 2SD, conductor 33, break contact 421 of relay RD, Fig. 4, conductor 32, make contact 225 of relay C, Fig. 2, middle bank and wiper of minor switch 2 in position 3, middle bank and wiper of minor switch 2 in position 2, conductor 24. As a result the stepping of the rotary switch RS by means of relays P1 and P2 and stepping magnet ROT continues and the switch is thus advanced through another complete cycle. As before, signal relay SIG operates with the rotary switch in position 5 and releases with the switch in position 7 and then reoperates with switch RS in position 9 and releases with the rotary switch in position 12 so that the called subscriber's code, consisting of two signal elements followed after an interval by three further signal elements, is transmitted for a second time. In this connection it will be noted that this interval between the first and second series of signal elements is constant irrespective of the number of signal elements in each series. For instance, if the first digit dialed into the code call apparatus had been 4 instead of 2 the first minor switch would have been set on position 4 and because of the reverse connection of the bottom bank of sender switch RS to the top bank of minor switch 1, contact 3 instead of contact 5 would have been marked in the bottom bank of the sender switch to cause operation of relay SIG already in position 3 of that switch. The SIG relay, therefore, would have remained operated while switch RS was stepping from position 3 to position 7 to cause the transmission of four signal elements, but then this relay would have been released by shorting in position 7 and reoperated by direct ground in position 9 exactly as described above. Furthermore, while the length of the interval between successive complete codes is to some extent dependent on the number of signal elements contained in both the first and second series of these elements the intelligibility of the code is not affected thereby as vacant contacts 16 to 20 in the bottom bank of switch RS act to introduce a minimum silent interval between successive codes. If, for any reason, relay SIG upon operating from direct ground on contact 9 of the bottom bank of switch RS, should fail to be released by shorting ground over one of the connections between contacts 1–6 of the top bank of minor switch 2 and contacts 10–15 of the bottom bank of sender switch RS, relay SIG will be "knocked down" over the direct connection between contact 16 in the last-mentioned bank and conductor 41 which connection by-passes the top wiper and bank of minor switch 2. Should the code call still be unanswered by the time the rotary switch reaches its home position 20 after its second cycle, i. e. its first complete revolution the switch is started for a third cycle, and so on; in this manner the transmission of the called party's code is repeated until this party answers the call.

When the called party hears his characteristic code signal, in the present example the signal 2—3, he proceeds to dial the code call answering number from the nearest telephone, this number in the instant case having as the first digit any of digits 1–7, as the second digit the digit 0 and as the last digit any convenient digit such as 0, all as explained above in connection with Fig. 1. In response to the first of these digits the selector is caused to seize an idle connector and responsive to the last two digits this connector is set on a set of terminals to which the code call answering trunk terminating in the code call apparatus is connected. Assuming that this trunk is not in use by a previous code call, the connector will test idle in the usual manner over its test wiper and bank contact (not shown), test lead SCA, Fig. 2, of the code call answering trunk, break contact **219*b* of relay A, resistor R2, battery. In consequence of this idle test ground is connected to test conductor SCA in the connector to hold this trunk busy; also ringing current superimposed by direct current is connected in the connector to the two talking conductors TCA and RCA in the usual manner. Relay A, Fig. 2, operates over its upper winding and its break contacts 216 and 218 in series with the ring cut off relay (not shown) in the connector, causing the connector to switch through in a well known manner. Relay A, Fig. 2, which is slow to operate in order to allow sufficient time for the ring cut off operation in the connector, locks to ground on test lead SCA, via its preliminary contact 219*a* marked "X" and its lower winding; at its break contact 219*b* relay A disconnects battery over resistance R2 from test conductor SCA; at its two make-before-break contacts 216, 217 and 218, 219 disconnects its upper winding from the talking conductors of the code call answering trunk and switches these conductors through to condensers C1 and C2 thereby completing a talking path between the code call calling and answering trunks; at its break contact 212 removes ground from the above traced starting circuit including conductor 24 thereby preventing the rotary switch from starting a new cycle after reaching its home position 20; and at its make contact 211 prepares a circuit for the release magnets of the two minor switches which, however, is not closed until rotary switch RS reaches home position 20 upon the next completion of a cycle. This last mentioned circuit may be traced as follows: ground, make contact 221 of relay C, make contact 211 of relay A, conductor 21, break contact 381 of relay P2, Fig. 3, middle wiper of rotary switch RS in position 20, conductor 43, break contact 431 of relay FA1, Fig. 4, conductor 39, and from there through operated off-normal contact 252, Fig. 2, and release magnet RLS of minor switch 1 to battery and also through operated off-normal contact 273, Fig. 2 and release magnet RLS of minor switch MS–2 to battery. Upon operation of their release magnets, both minor switches are therefore restored to their normal position in which the off-normal contacts of both switches are also returned to their normal condition. With ground removed from conductor 24** upon return of sender switch RS to its home position, relay B is caused to restore but the release of this relay has no function at this time.

It will be seen, therefore, that upon answering of the call by the paged subscriber the transmission of a coding cycle already begun is completed but the starting of the rotary sender switch for a new coding cycle prevented. Furthermore, a talking connection is established between the calling and called parties, the calling party receiving transmission battery through the windings of relay C and the transmitter of the called party being fed with transmission battery through the winding of the calling bridge relay of the connector in a manner well known in the art.

If at the end of the conversation the calling party is the first to replace his receiver, relay C releases due to the opening of the calling subscriber's loop. In releasing relay C at its make contact 223 opens the circuit of slow release relay D and at make contact 224 disconnects ground from the test lead SCC of the code call calling trunk thereby causing the preceding equipment to release.

However, upon release of relay D ground is again applied to test conductor SCC through make contact 215 of relay A which, assuming that the called subscriber is still on the line, is still operated and through break contact 245 of relay D. As a result the code call calling trunk is again made busy to other calls and is kept busy until the called party also releases. When the called subscriber disconnects, release of the calling bridge relay in the connector causes the connector used in the setting up of the answering call and also the equipment preceding the connector to release in a manner well known in the art so that ground is disconnected from test conductor SCA of the code call answering trunk and the locking circuit of relay A, Fig. 2, is opened. At its break contact **219*b* relay A upon restoring reconnects battery through resistance R2 to the test conductor SCA of the code call answering trunk to make this trunk available to other calls and, at its contact 215** relay A disconnects ground from the test lead SCC of the code call calling trunk to make this trunk available to other calls also.

Should the called subscriber be the first to release the connection relay A upon restoring at its break contact **219*b*** reconnects battery through resistance R2 to the test conductor SCA of the answering trunk to render this trunk available to new calls, but the test conductor SCC of the calling access remains guarded until ground is disconnected from the last mentioned conductor after the release of relays C and D incidental to the release of the calling party.

Assuming that the calling party abandons the call before the call has been answered by the desired party, relays C and D are released in succession to permit the preceding equipment to restore as described above, but since relay B is still operated from ground applied to conductor 24 at the top bank of sender switch RS, the test lead SCC of the code call calling trunk is kept guarded for the time being via make contact 231 of relay B and break contact 245 of relay D. Upon return of the sender switch RS to its normal position 20, the following circuit is closed for the release magnets RLS of the two minor switches: ground, break contact 222 of relay C, break contact 241 of relay D, conductor 21, break contact 381 of relay P2, Fig. 3, middle wiper of rotary switch RS in position 20, bank contact 20 of the middle bank of this switch, conductor 43, break contact 435 of relay FA1, Fig. 4, conductor 39, and from there through off-normal contact 252, Fig. 2, and release magnet RLS of minor switch 1 to battery, and in parallel thereto through off-normal contact 273, Fig. 2, and release magnet RLS of minor switch 2 to battery. Upon the operation of their release magnets the two minor switches are returned to normal as described above. Furthermore, as starting ground has been removed incident to the release of relays C and D from the above traced starting circuit of rotary switch RS, this switch remains in its home position 20 without beginning a new cycle of operation. Finally, as all ground connections are removed from conductor 24 upon return of switch RS to normal, relay B releases to disconnect ground from test conductor SCC of the calling trunk and thereby make this trunk available again to further calls.

As will be seen from Fig. 2, the talking conductors TCC(J) and RCC(J) terminating in the attendant's jack J are multipled to the corresponding talking conductors TCC and RCC of the code call calling trunk. Moreover, the conductor SCC(J) terminating in a busy lamp BL associated with the attendant's jack J, is multipled with the test conductor SCC of the code call calling trunk. These connections enable the attendant to initiate a code call from the attendant's jack J by plugging a dial cord into this jack and dialing the code call number of the desired party. Should the code call apparatus be busy from another call this condition would be indicated to the attendant by the lighting of busy lamp BL. A supervisory lamp SL also associated with the attendant's jack is connected via conductor SR(J) to make contact 243 of relay D, Fig. 2. As the armature spring of this last mentioned contact is connected to break contact 212 of relay A, it will readily be seen that supervisory lamp SL is lit upon seizure of the code call apparatus over the code call calling number, is extinguished upon answering of the code by the paged subscriber and is lit again upon disconnection of the called party until the calling party also releases.

As shown in Fig. 2, ground through resistor R3 is connected via conductor S1(J) to one spring of make contact JC associated with attendant's jack J, the other spring of this make contact being connected by a tie conductor to the sleeve of the jack. When the attendant plugs the aforementioned dial cord into jack J a relay (not shown) connected to the sleeve conductor of the plug operates from the last mentioned resistance ground on conductor S1(J) in response to the actuation of make contact JC to connect the operator's dial to the talking conductors of the dial cord. This arrangement has the purpose of preventing connection of the dial to these talking conductors in case the dial plug has not been fully inserted into the jack.

*Fire alarm call*

A party who upon noticing a fire wishes to originate a fire alarm, first dials the digit 9 to set the selector seized by his call on the ninth level as described above in connection with Fig. 1. Upon switch through of the selector, relay CB, Fig. 4, operates over the talking conductors TFC and RFC of the fire alarm calling trunk and the calling subscriber's loop. Relay CB in operating causes the operation of relay RD at make contact 412 of relay CB. Assuming that the code call apparatus is still seized by a previous paging call and that both minor switches are accordingly off normal, relay CB at contact 413 closes the following circuit for the release magnets of minor switches 1 and 2: ground, break contact 437 of relay FA1, Fig. 4, contact 413 of relay CB, conductor 39 and from there through off-normal contact 252 and release magnet RLS of minor switch 1 to battery, and in parallel thereto through off-normal contact 273 and release magnet RLS of minor switch 2 to battery. Both minor switches in releasing responsive to the operation of their release magnets open points in the above traced starting circuit, including the middle banks of both minor switches, for sender switch RS, thereby preventing the sender switch from restarting upon the next completion of a sender switch cycle.

In operating relay RD at break contact 421 opens another point in the aforementioned starting circuit for paging calls; at break contact 424 opens the impulsing circuit for setting the two minor switches on paging calls; at make contact 423 applies ground to test conductor SFC of the fire alarm calling trunk to make this trunk busy to other calls; at make contact 425 prepares an impulsing circuit for the setting of the two minor switches in connection with the instant fire alarm call; at make contact 426 prepares a circuit for relay FA1; and at make contact 422 closes a circuit for the supervisory lamp SL associated with the attendant's jack and, in parallel thereto, to relays 1SD and 2SD. This circuit may be traced as follows: ground, make contact 422 of relay RD, Fig. 4, conductor 31 and from there via conductor SR(J) to lamp SL and in parallel thereto via off-normal contact 271 of minor switch 2 through the lower winding of relay 2SD to battery, and also through off-normal contact 251 and the lower winding of relay 1SD to battery. Accordingly, both relays 1SD and 2SD are operated and supervisory lamp SL is lit. Relay 1SD at its make contact 262 prepares another point in the impulsing circuit of the rotary magnet ROT of minor switch 1, and at make contact 263 closes the following circuit for the operation of relay FA1: ground, make contact 263, Fig. 2, conductor 37, make contact 426 of relay RD, Fig. 4, relay FA1, battery.

When relay FA1 operates in this circuit its contacts 431 open a point in the circuit traced above over which relay SIG is periodically shorted out during the transmission of a paging signal; at make contact 432 relay FA1 closes shorting ground to the right hand terminal of relay SIG which ground serves to release this relay or prevent its reoperation, thereby preventing the transmission of any further signal elements incidental to a previously initiated paging call and causing the sender switch RS to return to normal at a rapid rate as described above. The last mentioned ground connection for shorting relay SIG may be traced as follows: ground, break contact 443 of relay FA2, Fig. 4, make contact 432 of relay FA1, conductor 52, right hand terminal of relay SIG, Fig. 3. At its make contact 433 relay FA1 closes the following circuit for code call answering relay A: ground, make contact 433 of relay FA1, Fig. 4, conductor 36, lower winding of relay A, Fig. 2, battery. Relay A upon operating in this circuit applies busy ground to the code call calling trunk via its make contact 215 and break contact 245 of relay D and extends the ground on conductor 36 to test conductor SCA of the code call answering number at its make contact 219*a*; both the code call calling and answering trunks are thereby guarded against seizure by a paging call or, if a paging call is already in progress, are kept guarded irrespective of the termination of the connection by the parties engaged in the paging call. Again returning to the operation of relay FA1, this relay at its make contact 434 prepares a circuit to relay FA2; at its make contact 436 closes a locking circuit for itself, which circuit may be traced through make contact 426 of relay RD; at break contact 437 relay FA1 opens another point in the aforementioned release circuit of minor switches 1 and 2; and at make contact 438 relay FA1 prepares an alternative locking circuit for itself.

The foregoing operations take place upon seizure of the code call apparatus after dialing of the first digit 8 of the fire alarm calling number by the alarm originating party. This party now dials the remaining two digits of this number which in the present instant are assumed to be 4—4, corresponding to the wiring of the bottom banks of minor switches 1 and 2, Fig. 2. In response to the first of these two digits, relay CB releases and reoperates four times, relay RD remaining operated during each of the two impulse series as it is slow to release. Upon the first release of relay CB the following circuit is established for magnet ROT of minor switch 1: ground, break contact 411 of relay CB, Fig. 4, make contact 425 of relay RD, conductor 35, make contact 262 of relay 1SD, Fig. 2, upper winding of relay 1SD, magnet ROT of minor switch 1, battery. Responsive to this first operation of its rotary magnet the wipers of minor switch 1 are advanced to their first operative position and the off-normal contacts of this switch are operated. At off-normal contact 251 the above traced circuit of the lower winding of relay 1SD is opened, but due to its slow release characteristics, this relay is held operated via its upper winding throughout the impulse series. At the end of this series of four impulses, the wipers of minor switch 1 are set on position 4 and relay 1SD releases. At its contact 262 relay 1SD opens the circuit to the upper winding of relay 1SD and the rotary magnet of minor switch 1 in series and at contact 261 it prepares the impulsing circuit to the rotary magnet of minor switch 2 in series with the upper winding of relay 2SD.

When the calling party sends the second series of four impulses the following circuit to the rotary magnet of minor switch 2 is closed upon the first release of relay CB: ground, break contact 411 of relay CB, Fig. 4, make contact 425 of relay RD, conductor 35, break contact 261 of relay 1SD, Fig. 2, make contact 281 of relay 2SD, upper winding of relay 2SD, magnet ROT of minor switch 2, battery. In response to the operation of the last mentioned magnet, minor switch 2 moves its wipers one step, thereby actuating its off-normal contact. Although the circuit to the lower winding of relay 2SD is broken at off-normal contact 271 of minor switch 2, relay 2SD due to its slow-release characteristic is held operated over its upper winding during the remaining part of the impulse series. At the end of the four impulses the wipers of minor switch 2 have been advanced to position 4 and relay 2SD releases opening at its make contact 281 the impulsing circuit for minor switch 2 and closing the following circuit for relay FA2, Fig. 4, this circuit having been prepared previously by the closing of off-normal contact 272 incident to the first step of minor switch 2: ground, make contact 422 of relay RD, Fig. 4, conductor 31, off-normal contact 272 of minor switch MS2, break contact 282 of relay 2SD, bottom wiper of minor switch 1 in position 4, contact 4 of the bottom bank of minor switch 1, contact 4 of the bottom bank of minor switch 2, bottom wiper of minor switch 2 in position 4, conductor 38, make contact 434 of relay FA1, Fig. 4, relay FA2, battery.

In operating relay FA2 at its break contact 441 opens another point in the aforementioned short circuit of relay SIG as used on paging calls; at its break contact 443 relay FA2 opens the other short circuit for relay SIG which circuit as mentioned above includes make contact 432 of relay FA1 and conductor 52; at its make contact 442 relay FA2 closes an obvious energizing circuit including conductor 47 for the winding of relay SIG, Fig. 3, in series with resistor R6, this circuit serving to keep the SIG relay continuously operated for the duration of the alarm call; at make contact 444 relay FA2 prepares a circuit including conductor 44 and the middle wiper of sender switch RS for the operation of relay CC, Fig. 4; at its make contact 445 relay FA2 prepares a circuit for the lower winding of relay SC2, this relay being one of three pulse rate dividing relays SC1, SC2 and SC3 shown in Fig. 4; at make contact 446 relay FA2 prepares a locking circuit for the lower or differential winding of relay CC; at make contact 448 relay FA2 closes ground to the start lead thereby operating the start relay ST of an interrupter machine shown in Fig. 4, which is assumed to be common to the automatic telephone exchange; and at make contact 447 relay FA2 closes the Pulse conductor to pulse rate dividing relay SC1 via break contact 462 of relay SC2. As shown in Fig. 4, the foregoing Pulse conductor is connected at the interrupter end to a cam operated interrupter contact IC, this cam being mounted on a motor driven shaft and the motor being started by operation of the aforementioned start relay ST. It will be understood that any other suitable interrupter device may be used instead of the device shown in Fig. 4 by way of example.

Before proceeding with the description of the code transmission on a fire alarm call, it may be well to explain the operation of the aforementioned pulse rate dividing relays SC1, SC2 and SC3, at this point. These relays functioning to actuate the siren control relay SCR, Fig. 4, at a pulse rate which is half of the rate of the pulses received by these relays from interrupter contact IC over the Pulse conductor, viz. as follows: on the first closure of interrupter contact IC ground on the pulse lead causes the operation of relay SC1 over the circuit last traced. Upon operating relay SC1 at its make contact 451 closes a circuit to siren control relay SCR via conductor SC and the last mentioned relay in turn completes an alternating current circuit to the siren at its contact SCC, thereby actuating the siren. At its make contact 452 relay SC1 prepares a locking circuit for itself in series with the lower winding of relay SC2. Upon the first removal of ground from the Pulse conductor at interrupter contact IC, a short circuit around the lower winding of relay SC2 is opened so that this relay now operates in the following locking circuit for relay SC1: ground, make contact 445 of relay FA2, lower winding of relay SC2, break contact 471 of relay SC3, make contact 452 of relay SC1, winding of relay SC1, battery. At its break contacts 462, 461, relay SC2 upon operating transfers the pulsing circuit from the winding of relay SC1 to the winding of relay SC3.

Upon the next closure of interrupter contact IC, ground on the Pulse lead operates relay SC3 which upon operating opens the locking circuit of relay SC1 at its contact 471 and completes an alternative locking circuit for relay SC2 which circuit may be traced as follows: ground, make contact 445 of relay FA2, lower winding of relay SC2, make contact 472 of relay SC3, non-inductive winding of relay SC2, battery. In releasing upon the opening of its locking circuit, relay SC1 at contact 452 opens another point in this locking circuit and at contact 451 removes ground from conductor SC, thereby releasing siren control relay SCR and thus causing the siren circuit to be broken at contact SCC of the last mentioned relay. When, upon the following opening of interrupter contact IC, ground is next removed from the Pulse lead, relay SC3 releases opening the circuit of relay SC2 so that the last mentioned relay also restores. All three pulse rate dividing relays SC1, SC2 and SC3 have thus returned to normal.

As will be clear from the foregoing description of the operation of relays SC1, SC2 and SC3, this relay group causes one pulse to be transmitted over the SC lead for every two pulses received over the Pulse lead, whereby the siren is controlled at a pulse rate half of that provided by interrupter contact IC. For example, if the last mentioned contact furnishes pulses at a rate of 30 I. P. M. or 1 pulse every two seconds, the siren will be actuated once every four seconds. More particularly, the siren will be on for two seconds and off for two seconds irrespective of the break percentage of the pulse received over the Pulse lead.

Returning now to the description of the transmission of the fire alarm code by sender switch RS, the operation of relay SIG, Fig. 3, from ground over make contact 442 of relay FA2, causes this ground to be extended to conductor 24 at make contact 334 of relay SIG. At its make contact 331, relay SIG prepares a circuit to the signaling devices over the Signal conductor and at its break-make contact 332, 333 it transfers the stepping ground on conductor 24 from relay P1 to relay PR1 (assuming that "M" wiring is used) to set the sender switch RS for slow stepping. After the sequential operation of relays PR1, PR2, P1 and P2, the last mentioned relay at its contact 382 extends the ground on conductor 24 to relay SR and magnet ROT of sender switch RS in multiple as above described in connection with a paging call. In operating, relay SR at its contact 323 opens another point in a circuit including conductor 46 which circuit serves to short relay SIG out on paging calls; at contact 321 it connects ground on conductor 24 via make contact 331 of relay SIG and the Signal conductor to the signaling devices, thereby beginning the transmission of the first signal element of the fire alarm code; and at its make contact 322 it prepares another point in the circuit for relay CC, Fig. 4.

Magnet ROT of sender switch RS, upon operating in parallel with relay SR, opens its interrupter contact 311 thereby causing the sequential release of relays PR1, PR2, P1, P2 and SR and also the release of magnet ROT itself. Relay SR in releasing open the circuit over the Signal conductor at its make contact 321, thereby terminating the transmission of the first signal element. Magnet ROT of rotary switch RS upon releasing advances the wipers of this switch into position 1. With the wipers of the sender switch in this position, a multiple ground is closed to conductor 24 through the strapping of the top bank contacts of switch RS and the top wiper of this switch in position 1 whereby ground is maintained on conductor 24 until the switch reaches its home position 20. At its middle bank and wiper switch RS prepares another point in the circuit of relay CC. In releasing, magnet ROT at its interrupter contact 311 also causes the sequential operation of relays PR1, PR2, P1, P2 and SR and the reoperation of magnet ROT in multiple with the last mentioned relay. When relay P1 operates in this fashion it prepares at its make contact 362 another point in the circuit of relay CC. Furthermore, when relay SR operates at the end of the stepping relay chain it reconnects ground to the signal conductor at its make contact 321 thereby beginning the transmission of the second signal element; at its make contact 322 relay SR closes the following circuit for the upper winding of relay CC: ground, make contact 444 of relay FA2, Fig. 4, conductor 44, middle wiper of sender switch RS in position 1, contact 1 of the middle bank of the sender switch, contact 322 of relay SR, contact 362 of relay P1, conductor 50, upper winding of relay CC, Fig. 4. Relay CC operates in this circuit and at its make contact 483 locks to make contact 446 of relay FA2; at contact 482 prepares a circuit for its differential winding; and at its make contact 481 closes a ground to the Signal conductor via closed contacts 331 of relay SIG, this ground being in multiple with the ground already applied to the Signal conductor through make contact 321 of relay SR.

As before, the stepping magnet ROT of sender switch RS operates in multiple with relay SR, causing the release of the stepping relay chain and the release of magnet ROT itself. When relay P1 restores in the aforementioned chain it opens at its contact 362 the operating circuit of relay CC, but this relay is held operated in the aforementioned locking circuit. Relay SR in releasing at the end of the chain opens another point in the operating circuit of relay CC at its make contact 322; and removes at its contact 321 one of the two ground connections to the Signal conductor, the other ground being maintained on the Signal conductor at make contact 481 of relay CC. Stepping magnet ROT upon releasing moves the wipers of switch RS into position 2 and its interrupter contact 311 brings about the sequential reoperation of the stepping relays.

Sender switch RS is stepped in this fashion into position 3 and from there into position 4 while ground is still kept on the Signal conductor due to the locked up condition of relay CC. When sender switch RS reaches position 4 upon the fourth release of magnet ROT, the following circuit is closed for the differential winding of relay CC: ground, make contact 444 of relay FA2, conductor 44, middle wiper of switch RS in position 4, contact 4 of the middle bank of this switch, conductor 48, make contact 482 of relay CC, Fig. 4, lower winding of relay CC, battery. As a result relay CC releases, opening its locking circuit at its contact 483, opening the circuit for its differential winding at contact 482, and removing ground from the signal lead at contact 481. At about the same time relay SR, the circuit of which was opened simultaneously with that of magnet ROT, at its contact 321 opens the other ground connection to the signal lead, whereby the transmission of the second signal element of the fire alarm code is terminated. It will be clear that this second signal element is a "long" element, being of a duration several times greater than the first.

When magnet ROT of sender switch RS released on advancing the switch from position 3 to position 4 as just described, it also reclosed the circuit of relay PR1 at its interrupter contact 311 thereby again causing the sequential operation of all stepping relays and the reoperation of magnet ROT itself. Relay SR in thus operating at the end of the stepping relay chain, reconnects ground to the signal lead, thereby beginning the transmission of the third signal element of the fire alarm code. Again magnet ROT operates in parallel with relay SR, causing the stepping relays to be released in succession, and magnet ROT itself is also restored at the end of this sequential operation. Relay SR in releasing at the end of the stepping relay chain disconnects ground from the signal lead at its contact 321 to terminate the transmission of the third signal element. It will be noted that this last mentioned signal element again is a short element. At about the same time magnet ROT, in releasing, steps the wipers of sender switch RS from position 4 to position 5.

It will readily be seen from the foregoing description that the stepping of sender switch RS from position 5 to position 6 under the control of the stepping relays PR1, PR2, etc., results in the transmission of another short signal element, the transmission of this fourth signal element beginning with the operation of relay SR upon the sequential reoperation of the stepping relays and ending with the release of relay SR upon the sequential release of the stepping relays. When magnet ROT of the rotary switch advances the wipers of this switch into position 6 at about the time that relay SR releases as just described, another circuit is prepared for the upper winding of relay CC at the middle wiper and bank of the sender switch, but this circuit is not closed until relay P1 and, a little later, relay SR, reoperate incident to the sequential reactuation of the stepping relays responsive to the closure of interrupter contact 311. With both relays P1 and SR reoperated, relay CC is operated for the second time, namely, over the following circuit: ground, make contacts 444 of relay FA2, Fig. 4, conductor 44, middle wiper of switch RS in position 6, contact 6 of the middle bank of this switch, contact 322 of relay SR, contact 362 of relay P1, conductor 50, upper winding of relay CC, Fig. 4, battery. Upon operating, relay C at its make contact 483 again locks to make contact 446 of relay FA2; at contact 482 prepares a circuit for its differential winding; and at contact 481 closes a multiple ground to the signal conductor.

When magnet ROT of sender switch RS reoperates in parallel with relay SR, the opening of interrupter contact 311 again causes the sequential release of the stepping relays preparatory to the advancement of sender switch RS from position 6 to position 7. As relay CC is held operated in the above traced locking circuit, ground from make contact 481 of relay CC is kept on the Signal conductor until the sender switch reaches position 9 in which position the CC relay is again released by energization of its differential winding. It will thus be seen that the fire alarm code consists of a short signal element, a long signal element and again a short signal element and that the transmission of this code is repeated as long as ground is maintained on conductor 47, the spacing between successive codes being equal to the spacing between the individual signal elements.

The present invention makes it possible for any party who, upon hearing the fire alarm code and/or the fire alarm siren, wishes to secure further information concerning the nature, scope, location, etc., of the emergency, to establish a talking connection with the alarm originating party by simply dialing the alarm checking number provided for this service. As this fire alarm checking number gives access to a group of conference circuits, the use of this number by one alarm checking party does not bar access to this number by further parties. Consequently, as many parties as there are conference circuits associated with this number may in this manner simultaneously be connected with the alarm originating party. Fig. 5, by way of example, shows two such conference circuits, each of these circuits terminating a trunk connected to the eighth level of the selector switches.

When the first party wishing to establish an alarm checking connection dials the digit 8, the selector seized in this call is set on its eighth level and then automatically cuts in on this level to seize the first idle trunk connected to the level, this trunk comprising the talking conductors TFA(1), RFA(1) and SFA(1), Fig. 5. As shown in this figure, the aforementioned trunk terminates in the first choice conference circuit comprising relays AB1 and RD1. Upon switch through of this selector, relay AB1 operates over the last mentioned trunk and the loop of the alarm checking party, causing the operation of slow release relay RD1 at its make contact 511. Relay RD1 in operating connects ground to test conductor SFA(1) at its make contact 521, thus rendering this trunk busy to other calls.

Should another alarm checking party subsequently dial the digit 8, the selector seized in this further alarm checking call upon being set on its eighth level will also automatically cut in on this level, but as the first conference trunk connected to this level is guarded at contact 521 of relay RD1, the selector will automatically begin a trunk hunting operation, thereby advancing its wipers to the second set of contacts in this level in the usual manner, this second set of contacts giving access to the second choice conference circuit comprising relays AB2 and RD2, Fig. 5, over the conference trunk including conductors TFA(2), RFA(2) and SFA(2). As this second choice trunk is assumed to be idle, relay AB2, Fig. 5, operates over this trunk and the subscriber's loop upon switch through of the selector. Relay AB2 at its contact 531 closes an obvious circuit to slow release relay RD2. Relay RD2 upon its operation, closes ground to test conductor SFA(2) at its contact 541, thereby guarding the second choice conference circuit against seizure by other calls.

As will be seen from an inspection of Figs. 4 and 5, the three parties are now connected in a conference connection, including conductors 61, 62 and condensers C1, C2 and C3, C4, the alarm originating party receiving transmission battery through the windings of relay CB, Fig. 4, and the two alarm checking parties receiving their talking battery through the windings of relays AB1 and AB2 respectively. Each of the alarm checking parties may thus converse with the calling party and thereby obtain from this party any necessary information with regard to location, etc., of the fire. It should also be noted that contrary to the operation of the code call apparatus in connection with paging calls, no provisions are made for stopping the transmission of a fire alarm code signal upon answering of the signal by an alarm checking party, the release of the code call apparatus in the case of a fire alarm call being exclusively under the control of the alarm originating party.

When the alarm originating party wishes to stop the transmission of the fire alarm signals he replaces his receiver so that relay CB, Fig. 4, restores responsive to the opening of the subscriber's loop. Upon release, relay CB at contact 412 opens the circuit of relay RD which releases slowly. After restoring, relay RD at contact 422 removes ground from conductor 31 thereby extinguishing supervisory lamp SL and also opening the circuit of relay FA2, Fig. 4; at contact 423 relay RD removes busy ground from test conductor SFC of the fire alarm calling trunk; and at contact 427 relay RD closes an alternative locking circuit for relay FA1 which circuit may be traced from ground on conductor 24, through make contact 438 of relay FA1, break contact 427 of relay RD, relay FA1, to battery. This circuit serves to maintain relay FA1 operated until sender switch RS reaches its home position 20.

When relay FA2 restores incidental to the release of relay RD, relay FA2 at its contact 442 removes a ground connection from the left hand terminal of relay SIG, another ground connection still being maintained on this terminal via make contact 334 of relay SIG provided sender switch RS is in any of its operative positions at this time; and at its break contact 443 relay FA2 connects ground to the right hand terminal of relay SIG, Fig. 3, via make contact 432 of relay FA1 and conductor 52 to cause the release of relay SIG by virtue of this short circuit; at contact 446 relay FA2 opens the locking circuit of relay CC to cause this relay to restore if it happens to be operated at this time; at contact 448 relay FA2 removes a starting ground from the interrupter thereby restoring relay ST unless this relay is held operated by ground connected to the start lead by other telephone equipment; and at contact 447 relay FA2 disconnects the pulse rate dividing relays from the Pulse lead so that all of relays SC1, SC2 and SC3 resume their normal condition, thereby preventing any further sounding of the siren on this fire alarm call.

When relay SIG, Fig. 3, releases due to the short circuit traced above, it removes ground from the signal lead at contact 331, thus preventing the transmission of any further code signal elements; at contacts 333, 332 relay SIG transfers stepping ground on conductor 24 from relay PR1 to relay P1 to cause sender switch RS to return to normal at a rapid rate; and at contact 334 the SIG relay opens its own locking circuit. Therefore, as soon as sender switch RS reaches its home position 20 under the control of the stepping relays, all ground connections are removed from conductor 24 whereby the sender switch is prevented from being driven through another stepping cycle. Removal of ground from conductor 24 also permits relay FA1, Fig. 4, to restore. Upon its release relay FA1 at its contact 432 opens the above mentioned ground connection from the right hand terminal of relay SIG; at its break contact 433 relay FA1 removes guarding ground from test lead SCA of the code call answering trunk and causes the de-energization of the lower winding of relay A; and at its contact 435 relay FA1 completes a circuit for the release magnets of minor switches 1 and 2, this circuit having been previously prepared when sender switch RS was advanced to its home position 20. This last mentioned circuit may be traced as follows: ground, break contact 222 of relay C, Fig. 2, break contact 241 of relay D, conductor 21, break contact 381 of relay P2, Fig. 3, middle wiper of sender switch RS in position 20, contact 20 of the middle bank of this switch, conductor 43, break contact 435 of relay FA1, Fig. 4, conductor 39 and from there through off-normal contact 252, Fig. 2 and release magnet RLS of minor switch 1 to battery, and in parallel thereto through off-normal contact 273 and release magnet RLS of minor switch 2 to battery. Upon operation of their release magnets, both minor switches return to their normal positions in which the last mentioned off-normal contact opens the last traced operating circuit for the release magnets of the two switches. Furthermore, when relay A releases responsive to the aforementioned de-energization of its lower winding, it unguards the code call calling access at its contact 215, and at its contact **219*b*** relay A reconnects resistance battery to the test conductor of the code call answering trunk; thus, both these trunks are available again to other calls.

It will be noted that the code call apparatus is released as described regardless of whether the alarm originating party clears before or after answering of one or more alarm checking parties. In fact, the fire alarm calling trunks on the one hand and the fire alarm checking trunks on the other hand are entirely independent of each other in the illustrated embodiment. Therefore if the alarm originating party clears while two alarm checking parties are still respectively connected to the two conference circuits shown, these last mentioned two parties remain effectively connected together notwithstanding the fact that the release of the alarm originating party renders the combined code call and fire alarm apparatus available again to further paging or fire alarm calls. Thus the present invention permits the transmission of a code call signal or, if desired, the transmission of another fire alarm signal, while a conversation between a plurality of fire alarm checking parties is in progress; permits the transmission of a fire alarm signal while a conversation between a paging party and a paged party is in progress; and permits simultaneous conversations to be held between a paging and paged party and between an alarm originating party and one or more fire alarm checking parties or between a number of alarm checking parties inter se.

In this connection it should be noted that the combined code call and fire alarm apparatus shown in Figs. 2, 3 and 4 of the drawings is operable whether the conference circuits shown in Fig. 5 are used or not, that is, whether or not provisions for a talking connection between one or more alarm checking parties and the alarm originating party are made. Furthermore, while the system is preferably arranged so that the fire alarm calling and checking numbers may be dialed from any substation of the automatic telephone exchange, provision could be made to restrict this service to specific telephones, for instance by corresponding marking of the line finder and selector banks. Moreover, while in the embodiment of the invention described above both the code call calling trunk and the fire alarm calling trunk are assumed to be connected to selector levels, these trunks could obviously be connected to switch through levels of the connectors instead.

The invention is further not limited to combined code call and alarm apparatus having two talking paths associated therewith, one for paging calls and the other for alarm calls as shown in the above described embodiment, but may also be embodied in code call apparatus having more than two talking paths, for instance, having a number of transmission circuits associated with the paging system which permit a number of paging connections to exist simultaneously. Also, while in the example described above the fire alarm originating party, in order to start the transmission of a fire alarm after gaining access to the code call apparatus itself must send further impulses into this apparatus whereby the erroneous transmission of a fire alarm due to dialing of a wrong number is largely avoided, the apparatus could also be arranged to begin the transmission of the fire alarm signals immediately in response to the seizure of the apparatus over the fire alarm calling access.

The fire alarm key shown in the right hand portion of Fig. 4 makes it possible to initiate the transmission of a fire alarm signal entirely without dialing, that is, without the aid of the switches of the automatic telephone exchange. This switch may be provided in any convenient location; also a number of such keys may be provided in multiple.

When the fire alarm key K, Fig. 4, is operated, ground is connected over the FAK conductor to relay FA which is thereby caused to operate. At its make contact 492 relay FA closes the following circuit for relay A, Fig. 2: ground, make contact 492 of relay FA, conductor 36, lower winding of relay A, Fig. 2, battery. Relay A in operating connects busy ground to the test conductors of the code call calling and answering trunks. At contact 493 relay A connects ground via conductor 42 to the first contact in the bottom bank of sender switch RS, thereby preparing an operating circuit for relay SIG, Fig. 3. At its break contact 491 relay FA opens a short circuiting path for relay SIG as used in connection with paging calls; and at make contact 494 relay FA extends ground on conductor FAK to conductor 24, thereby starting the operation of the sender switch in the manner described above.

Upon reaching position 1, switch RS at its top wiper connects a multiple ground to conductor 24, thus providing for the continued step by step movement of this switch until it reaches its home position 20; and at its bottom wiper rotary switch RS in position 1 prepares a circuit for relay SIG which circuit is completed upon the following release of relay SR incidental to the opening of interrupter contact 311 and the consequent sequential release of the stepping relays. This circuit for relay SIG may be traced as follows: ground, make contact 493 of relay FA, Fig. 4, conductor 42, contact 1 of the bottom bank of sender switch RS, bottom wiper of switch RS in position 1, contact 323 of relay SR, conductor 46, contact 431 of relay FA1, Fig. 4, contact 441 of relay FA2, conductor 47, relay SIG, Fig. 3, resistor R6, battery.

Upon operation, the signal relay at its contact 334 locks to ground on conductor 24, at contact 321 prepares a circuit to the signaling device or devices and at contacts 332, 333 transfers the stepping ground on conductor 24 from relay P1 to relay PR1 to cause the sender switch RS to continue its stepping movement at a rapid rate. It will thus be seen that transmission of the first signal element over the Signal conductor is begun when relay SR reoperates upon the second sequential operation of the stepping relay chain. As the signal relay remains locked over its contact 334 in this type of operation, ground is applied to the Signal conductor and the signal element accordingly is transmitted on each step of switch RS while relay SR is operated during the sequential release action of the stepping relays. As a result, the signaling devices connected to the Signal conductor are intermittently sounded once for each step of the sender switch. No actuation of the siren has been provided in connection with this type of fire alarm.

If the fire alarm key is still in its operated position at the time switch RS reaches its home position 20, a new stepping cycle for sender switch RS is started due to ground being maintained on conductor 24 via conductor FAK and make contact 494 of relay FA. If the fire alarm key is restored to normal while the sender switch is in any of its operative positions, the switch will continue its step by step movement until it reaches its home position and the intermittent sounding of the signaling device is continued during this last mentioned movement of the switch. As soon as the switch reaches its home position 20, ground is disconnected from conductor 24 at the top wiper of the switch so that the switch cannot be started for another stepping cycle.

In concluding, it may be mentioned that the following condensers and resistors shown in Figs. 3 and 4 of the drawings are provided for spark suppression purposes: resistor R1 and condenser C4, Fig. 3, resistor R2 and condenser C3, Fig. 3, and resistor R1 and condenser C1, Fig. 4. The non-inductive resistance windings of some of the relays and magnets shown in Figs. 2, 3 and 4 with the exception of the upper winding of relay SC2 also are provided for spark suppression purposes.

While I have shown and described a particular embodiment of my invention, it will be obvious to those skilled in the art that changes and modifications such as those indicated above may be made without departing from my invention in its broader aspects. I therefore aim in the appended claims to cover all such changes and modifications as fall within the true spirit and scope of my invention.

What I claim is:

1. In a telephone system, code call apparatus, a plurality of calling lines, a plurality of called lines, two calling points of access to said apparatus adapted to be seized by any of said calling lines, an answering point of access to said apparatus adapted to be seized by any of said called lines, means in said apparatus for producing a predetermined code signal after seizure of a first one of said two points of access by any one of said calling lines, means in said apparatus for establishing a talking connection between a calling line seized with said apparatus and a called line after seizure of said answering point of access by said called line, and means responsive to seizure of said apparatus by a calling line over a second of said two points of access to suppress the production by said apparatus of a code signal originated by another calling line seized with the first of the two calling points of access.

2. In a telephone system, code call apparatus, a plurality of calling lines, a plurality of called lines, two calling points of access to said apparatus adapted to be seized by any of said calling lines, an answering point of access to said apparatus adapted to be seized by any of said called lines, means in said apparatus responsive to impulses for producing a predetermined code signal after seizure of one of said two points of access by any one of said calling lines, means in said apparatus for stopping the production of said code signal and for establishing a talking connection between a calling line seized with said apparatus and a called line after seizure of said answering point of access by said called line, and means responsive to seizure of said apparatus by a calling line over the other of said two calling points of access for producing a second predetermined code signal and continuing the production of said code signal so long as said other point of access is seized by the calling line.

3. In a telephone system, a combined code call paging and alarm signal producing apparatus, a code call calling line, an alarm calling line, a code call answering line, an alarm answering line, a first calling point of access to said apparatus for seizure by said code call calling line, a first answering point of access to said apparatus for seizure by said code call answering line, a second calling point of access to said apparatus for seizure by said alarm calling line, a second answering point of access to said apparatus for seizure by said alarm answering line, said apparatus having a first talking path interconnected between said first calling and answering points of access and a second talking path interconnected between said second calling and answering points of access, first means responsive to seizure of said first calling point of access to initiate production of a coded paging signal by said apparatus, second means responsive to seizure of said second calling point of access to initiate production of an alarm signal by said apparatus, means responsive to seizure of said first answering point of access to stop production of the coded paging signal after completion of its code cycle, the seizure of said first answering point of access being effective to complete a talking connection between said code call calling line and said code answering line that can be completely released only by the release by said code answering line of said first answering point of access, and third means responsive to seizure of said second calling point of access during seizure of said first calling point of access and prior to seizure of said first answering point of access to immediately stop the production of a paging signal.

4. In a telephone system, a combined code call paging and alarm signal producing apparatus, a code call calling line, an alarm calling line, a code call answering line, an alarm answering line, a first calling point of access to said apparatus for seizure by said code call calling line, a first answering point of access to said apparatus for seizure by said code call answering line, a second calling point of access to said apparatus for seizure by said alarm calling line, a second answering point of access to said aparatus for seizure by said alarm answering line, said apparatus having a first talking path interconnected between said first calling and answering points of access and a second talking path interconnected between said second calling and answering points of access, first means responsive to seizure of said first calling point of access to initiate production of a coded paging signal by said apparatus, second means responsive to seizure of said second calling point of access to initiate production of an alarm signal by said apparatus, the seizure of said first answering point of access being effective to complete a talking connection between said code call calling line and said code answering line that can be completely released only by the release by said code answering line of said first answering point of access, and third means responsive to seizure of said second calling point of access during seizure of said first calling point of access and prior to seizure of said first answering point of access to immediately stop the production of a paging signal.

5. In a telephone system, a combined code call paging and alarm signal producing apparatus, a code call calling line, an alarm calling line, a code call answering line, an alarm answering line, a first calling point of access to said apparatus for seizure by said code call calling line, a first answering point of access to said apparatus for seizure by said code call answering line, a second calling point of access to said apparatus for seizure by said alarm calling line, a second answering point of access to said apparatus for seizure by said alarm answering line, said apparatus having a first talking path interconnected between said first calling and answering points of access and a second talking path interconnected between said second calling and answering points of access, means in said apparatus responsive to impulses received from either seized calling point of access to set the apparatus to produce a predetermined signal, and means responsive to seizure of the second calling point of access during seizure of said first calling point of access and prior to seizure of said first answering point of access to immediately reset the apparatus to thereby stop the production of the signal set by the first calling line.

6. In a telephone system, a combined code call paging and alarm signal producing apparatus including register means and a sender switch, a code call calling line, an alarm calling line, a code call answering line, an alarm answering line, a first calling point of access to said apparatus for seizure by said code call calling line, a first answering point of access to said apparatus for seizure by said code call answering line, a second calling point of access to said apparatus for seizure by said alarm calling line, a second answering point of access to said apparatus for seizure by said alarm answering line, said apparatus having a first talking path interconnected between said first calling and answering points of access and a second talking path interconnected between said second calling and answering points of access, means in said apparatus responsive to impulses received from either seized calling point of access to set the register means to cause the sender means to produce a predetermined signal, and means responsive to seizure of the second calling point of access during seizure of said first calling point of access and prior to seizure of said first answering point of access to immediately reset the register means and cause said sender switch to return to normal at an accelerated rate to thereby stop the production of the signal set by the first calling line.

7. In a telephone system, a combined code call paging and alarm signal producing apparatus, a code call calling line, an alarm calling line, a code call answering line, an alarm answering line, a first calling point of access to said apparatus for seizure by said code call calling line, a first answering point of access to said apparatus for seizure by said code call answering line, a second calling point of access to said apparatus for seizure by said alarm calling line, a second answering point of access to said apparatus for seizure by said alarm answering line, said apparatus having a first talking path interconnected between said first calling and answering points of access and a second talking path interconnected between said second calling and answering points of access, and means responsive to seizure of said second calling point of access to guard said apparatus against seizure of the first point of access.

8. In a telephone system, a combined code call paging and alarm signal producing apparatus, a code call calling line, an alarm calling line, a code call answering line, an alarm answering line, a first calling point of access to said apparatus for seizure by said code call calling line, a first answering point of access to said apparatus for seizure by said code call answering line, a second calling point of access to said apparatus for seizure by said alarm calling line, a second answering point of access to said apparatus for seizure by said alarm answering line, said apparatus having a first talking path interconnected between said first calling and answering points of access and a second talking path interconnected between said second calling and answering points of access, first means responsive to seizure of said first calling point of access to initiate production of a coded paging signal by said apparatus, and second means responsive to seizure of said second calling point of access to initiate production of an alarm signal by said apparatus, said second means responsive to seizure of said second calling point of access being connected to guard said apparatus against seizure of the first point of access and to stop production of a paging signal originated by a previous seizure of said first point of access.

9. In a telephone system, a combined code call paging and alarm signal producing apparatus, a code call calling line, an alarm calling line, a code call answering line, an alarm answering line, a first calling point of access to siad apparatus for seizure by said code call calling line, a first answering point of access to said apparatus for seizure by said code call answering line, a second calling point of access to said apparatus for seizure by said alarm calling line, a second answering point of access to said apparatus for seizure by said alarm answering line, said apparatus having a first talking path interconnected between said first calling and answering points of access and a second talking path interconnected between said second calling and answering points of access, first means responsive to seizure of said first calling point of access and reception of impulses to initiate production of a coded paging signal by said apparatus, second means responsive to seizure of said second calling point of access to initiate production of an alarm signal by said apparatus, and third means responsive to seizure of said first answering point of access to stop production of the coded paging signal, said second means responsive to the seizure of said second calling point of access being connected to continue the production of the alarm signal after seizure of said second answering point of access.

10. In a telephone system, a combined code call paging and alarm signal producing apparatus, a code call calling line, an alarm calling line, a code call answering line, an alarm answering line, a first calling point of access to said apparatus for seizure by said code call calling line, a first answering point of access to said apparatus for seizure by said code call answering line, a second calling point of access to said apparatus for seizure by said alarm calling line, a second answering point of access to said apparatus for seizure by said alarm answering line, said apparatus having a first talking path interconnected between said first calling and answering points of access and a second talking path interconnected between said second calling and answering points of access, first means responsive to seizure of said first calling point of access to initiate production of a coded paging signal by said apparatus, second means responsive to seizure of said second calling point of access to initiate production of an alarm signal by said apparatus, third means responsive to seizure of said first answering point of access to stop production of the coded paging signal, and fourth means responsive to seizure only of said second calling point of access to guard against seizure of said first calling point of access and to stop the production of a paging signal.

11. In a telephone system, a combined code call paging and alarm signal producing apparatus, a code call calling line, an alarm calling line, a code call answering line, an alarm answering line, a first calling point of access to said apparatus for seizure by said code call calling line, a first answering point of access to said apparatus for seizure by said code call answering line, a second calling point of access to said apparatus for seizure by said alarm calling line, a second answering point of access to said apparatus for seizure by said alarm answering line, said apparatus having a first talking path interconnected between said first calling and answering points of access and a second talking path interconnected between said second calling and answering points of access, means connected with said first talking path for guarding said first calling point of access against seizure until a connection set up over said first path has been cleared by release of both code called and code calling lines, and means connected with said second talking path for guarding said second calling point of access against seizure until a connection set up over said second path has been cleared by release of the alarm calling line.

12. In a telephone system, a combined code call paging and alarm signal producing apparatus, a code call calling line, an alarm calling line, a code call answering line, an alarm answering line, a first calling point of access to said apparatus for seizure by said code call calling line, a first answering point of access to said apparatus for seizure by said code call answering line, a second calling point of access to said apparatus for seizure by said alarm calling line, a second answering point of access to said apparatus for seizure by said alarm answering line, said apparatus having a first talking path interconnected between said first calling and answering points of access and a second talking path interconnected between said second calling and answering points of access, means connected with said first talking path for guarding only said first calling point of access against seizure until a connection set up over said first path has been cleared by release of both code called and code calling lines, and means connected with said second talking path for guarding both said first and second calling points of access against seizure until a connection set up over said second path has been cleared by release of the alarm calling line.

13. In a telephone system, an alarm signal producing apparatus, an alarm calling line, a plurality of alarm answering lines, a calling point of access to said apparatus for seizure by said alarm calling line, a conference path for interconnecting said plurality of answering lines, an answering point of access to said apparatus for seizure by said conference path, and means responsive to seizure of said calling point of access to initiate production of an alarm signal by said apparatus so long as said calling point of access is seized and regardless of the connection of said alarm answering lines over said conference path.

14. In a telephone system, a combined code call paging and alarm signal producing apparatus, a code call calling line, an alarm calling line, a code call answering line, a plurality of alarm answering lines, a first calling point of access to said apparatus for seizure by said code call calling line, a first answering point of access to said apparatus for seizure by said code call answering line, a second calling point of access to said apparatus for seizure by said alarm calling line, a conference path for interconnecting said plurality of alarm answering lines, a second answering point of access to said apparatus for seizure by said conference path, said apparatus having a first talking path interconnected between said first calling and answering points of access and a second talking path interconnected between said second calling and answering points of access, first means responsive to seizure of said first calling point of access to initiate production of a coded paging signal by said apparatus, second means responsive to seizure of said second calling point of access to initiate production of an alarm signal by said apparatus so long as the second calling point of access is seized, and third means responsive to seizure of said first answering point of access to stop production of the coded paging signal.

References Cited in the file of this patent

UNITED STATES PATENTS

| | | |
|---|---|---|
| 2,384,938 | Lomax | Sept. 18, 1945 |
| 2,478,453 | Blyholder | Aug. 9, 1949 |
| 2,496,629 | Lamberty et al. | Feb. 7, 1950 |
| 2,552,799 | Lomax | May 15, 1951 |
| 2,658,110 | Lomax | Nov. 3, 1953 |

FOREIGN PATENTS

| | | |
|---|---|---|
| 498,520 | Great Britain | Jan. 9, 1939 |